United States Patent
Nakazawa et al.

(10) Patent No.: US 7,416,220 B2
(45) Date of Patent: Aug. 26, 2008

(54) TRANSPARENT FUEL TANK FOR MOTORCYCLES

(75) Inventors: Yoshihiro Nakazawa, Wako (JP); Toshikzau Saito, Wako (JP); Mitsugu Yoshida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 355 days.

(21) Appl. No.: 11/235,501

(22) Filed: Sep. 26, 2005

(65) Prior Publication Data

US 2006/0065459 A1    Mar. 30, 2006

(30) Foreign Application Priority Data

Sep. 29, 2004   (JP) .............................. 2004-283431

(51) Int. Cl.
*B60P 3/22* (2006.01)

(52) U.S. Cl. ........................................ 280/835; 220/562

(58) Field of Classification Search ................. 280/835; 220/562
See application file for complete search history.

(56) References Cited

U.S. PATENT DOCUMENTS 3,987,294 A * 10/1976 Carlson ....................... 362/101
6,641,169 B2 * 11/2003 Fukunaga et al. ........... 280/835

FOREIGN PATENT DOCUMENTS

JP            4-92790         3/1992

* cited by examiner

*Primary Examiner*—Lesley D. Morris
*Assistant Examiner*—Michael R Stabley
(74) *Attorney, Agent, or Firm*—Hamre, Schumann, Mueller & Larson, P.C.

(57) ABSTRACT

A transparent fuel tank for a motorcycle in which the state of wiring and piping under the fuel tank can be inspected. The transparent fuel tank is formed of transparent resin so that piping and wiring under the fuel tank can be visually inspected including during rotation of the transparent fuel tank between a normal position and a maintenance position.

3 Claims, 5 Drawing Sheets

TRANSPARENT FUEL TANK FOR MOTORCYCLES

FIELD

The disclosed invention relates to a transparent fuel tank for a motorcycle through which the state of components, such as a fuel hose, disposed under the fuel tank can be seen.

BACKGROUND

A cowling for a motorcycle through which the state of components can be seen is known. For example, in Japanese Patent Document No. 4-92790, a cowling Cf for a motorcycle is formed of transparent material so as to achieve see-through from the side, whereby cylinder members 5, 6 of an engine E can be seen.

However, with the cowling for a motorcycle disclosed in Japanese Patent Document No. 4-92790, a portion which corresponds to a part where wiring and piping exist, such as a bottom of a fuel tank, is not transparent, and hence the state of the wiring and piping under the fuel tank cannot be seen.

SUMMARY

The disclosure relates to a transparent fuel tank for a vehicle, such as a motorcycle, through which the state of wiring and piping under the fuel tank can be inspected.

In one aspect of the invention, a fuel tank to be mounted to a motorcycle is formed of transparent resin so that the piping and wiring under the fuel tank can be viewed. Since the transparent fuel tank is formed of transparent resin, an extent of bending or a behavior of the piping and wiring in the same state as if disposed under a normal fuel tank can be inspected through the transparent fuel tank.

In another aspect of the invention, the transparent fuel tank has the same shape as conventional fuel tanks and can include a bottom plate and a body portion combined together. Consequently, the weight of the transparent fuel tank can be reduced by controlling the plate thickness of the structure, and hence a light weight transparent fuel tank can be obtained.

Further, when liquid which corresponds to fuel is filled in the structure including the bottom plate and the body portion combined together, the behavior of the liquid surface during acceleration and deceleration can be viewed.

In another embodiment, the transparent fuel tank has the same shape as the bottom plate of conventional fuel tanks. Consequently, the piping and wiring is viewed only through the transparent bottom plate, and the piping and wiring can be seen with less distortion than in the case of the piping and wiring being viewed through the bottom plate and the body portion.

In one embodiment, the transparent fuel tank is connected to fuel piping. As a result, an actual movement of the piping while rotating the transparent fuel tank can be visually inspected.

Further, the transparent fuel tank can be utilized as a jig for confirming the wiring and the piping under the fuel tank. This permits visual inspection of the actual movement of the wiring and piping while rotating the jig.

In one embodiment, part of the body portion of the transparent fuel tank is opened so that the wiring and the piping under the bottom plate can be inspected from inside of the tank. As a result, the wiring and piping can be viewed through the transparent bottom plate from the opening. Therefore, since the piping is viewed through the transparent bottom plate, the piping can be seen with less distortion than in the case of the piping being viewed through the bottom plate and the body portion.

DRAWINGS

DETAILED DESCRIPTION

Figure 1:
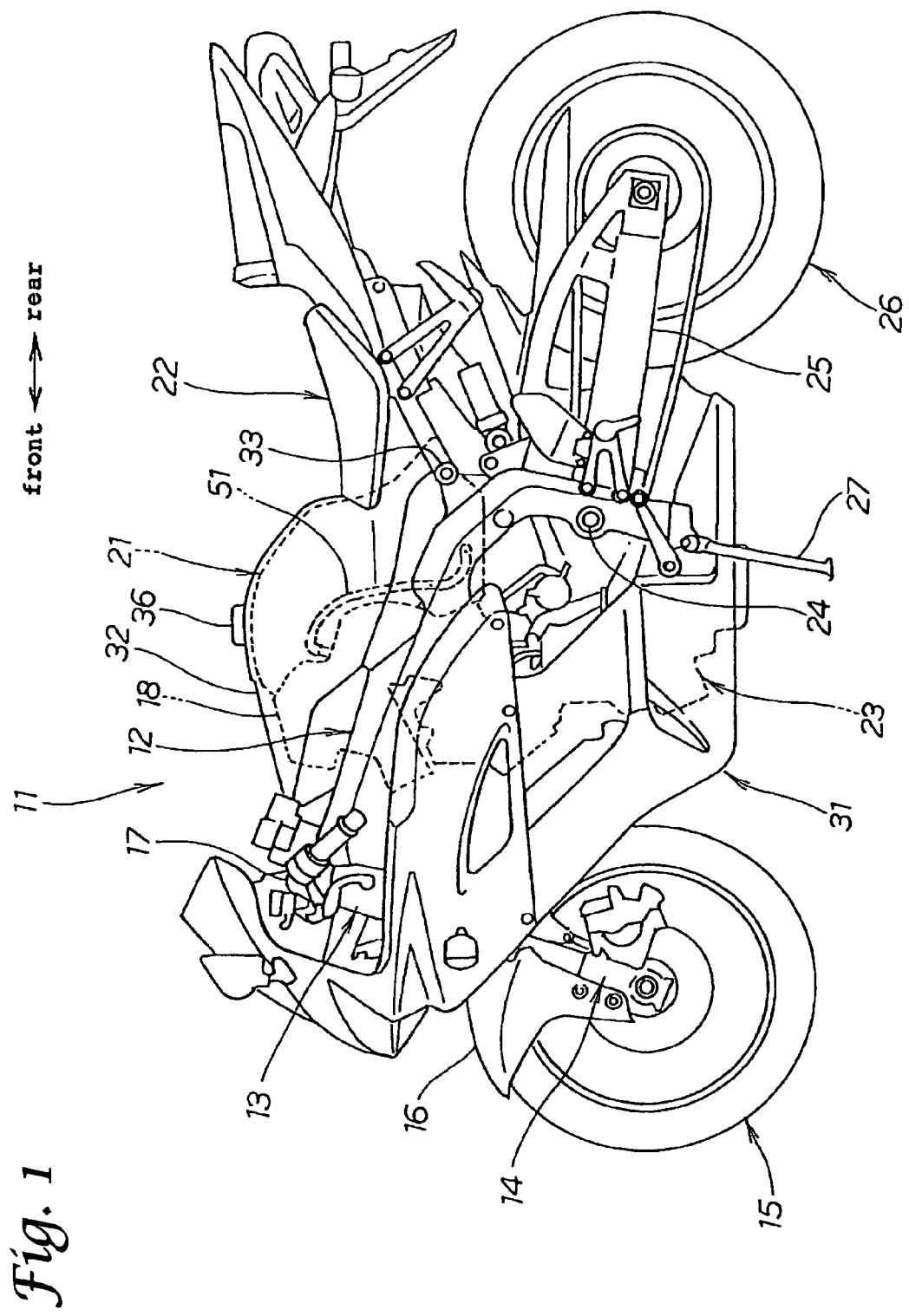
FIG. 1 is a side view of a motorcycle with a normal fuel tank as an example of a vehicle on which a transparent fuel tank according to the present invention can be used.

Referring now to the accompanying drawings, a best mode for carrying out the invention will be described below. The drawings are to be viewed in the direction in which reference numerals can be seen correctly. The terms "front", "rear", "left", "right", "up" and "down-" represent directions viewed from a rider's perspective.

FIG. 1 is a side view of a motorcycle 11 as an example of a vehicle to be used with a transparent fuel tank according to the present invention.

The motorcycle 11 includes a vehicle body frame 12, a front fork 14 mounted to a head pipe 13 of the vehicle body frame 12, a front wheel 15 and a front fender 16 mounted to the front fork 14, a handle 17 connected to the front fork 14, an air cleaner 18 and a fuel tank 21 mounted to an upper front portion of the vehicle body frame 12, a seat 22 mounted on top at a center of the vehicle body frame 12, an engine 23 disposed at the center of the vehicle body frame 12, a swing arm 25 mounted to the vehicle body frame 12 via a pivot bolt 24, a rear wheel 26 mounted to the swing arm 25, a stand 27 mounted to a lower portion of the vehicle body frame 12, and a cowling 31 mounted to the vehicle body frame 12.

The cowling 31 includes an upper cowl 32 for covering the air cleaner 18 and the fuel tank 21.

The vehicle body frame 12 is provided with a link hinge member 33 at an upper center portion thereof. The fuel tank 21 illustrated in FIG. 1 is a tank for holding gasoline, and has a structure to connect a tank hinge 34 (see FIG. 3) to the link hinge member 33, whereby the tank hinge 34 enables rotation of the fuel tank 21 between a normal position shown in FIG. 1 and an inspection and maintenance position 35 (see FIG. 2). Reference numeral 36 designates a cap of the fuel tank 21.

While the fuel tank 21 is preferably made from metal, the material used to form the fuel tank 21 is arbitrary.

Figure 2:
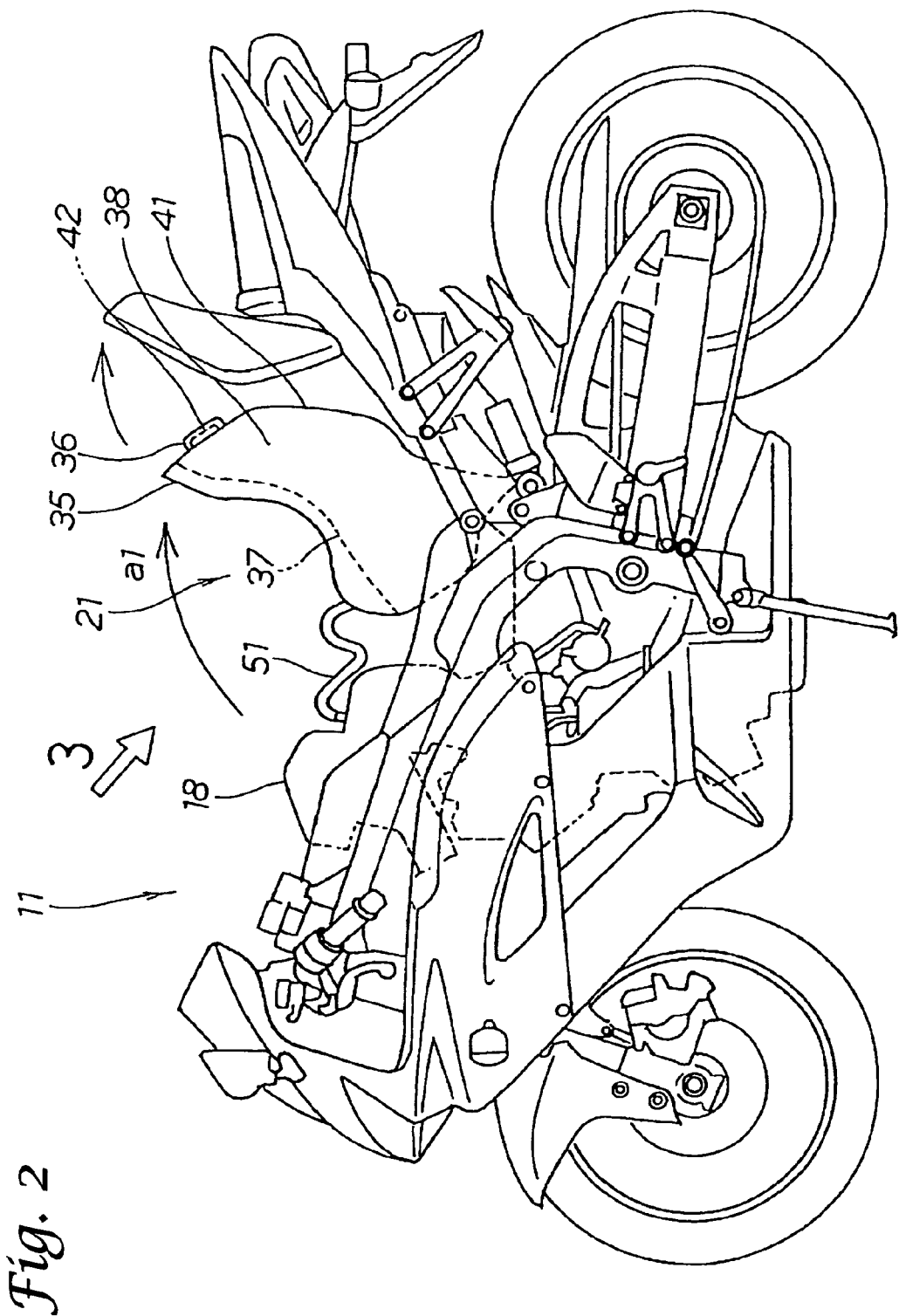
FIG. 2 is a drawing showing the fuel tank of FIG. 1 rotated to an inspection and maintenance position.

FIG. 2 is a view similar to FIG. 1 but showing the fuel tank rotated in the direction of arrow a1 to an inspection and maintenance position 35. In the motorcycle 11, inspection and maintenance of components such as the air cleaner 18, a hose, or electric equipment are enabled by rotating the fuel tank 21 in the direction indicated by an arrow a1 to the inspection and maintenance position 35.

Figure 3:
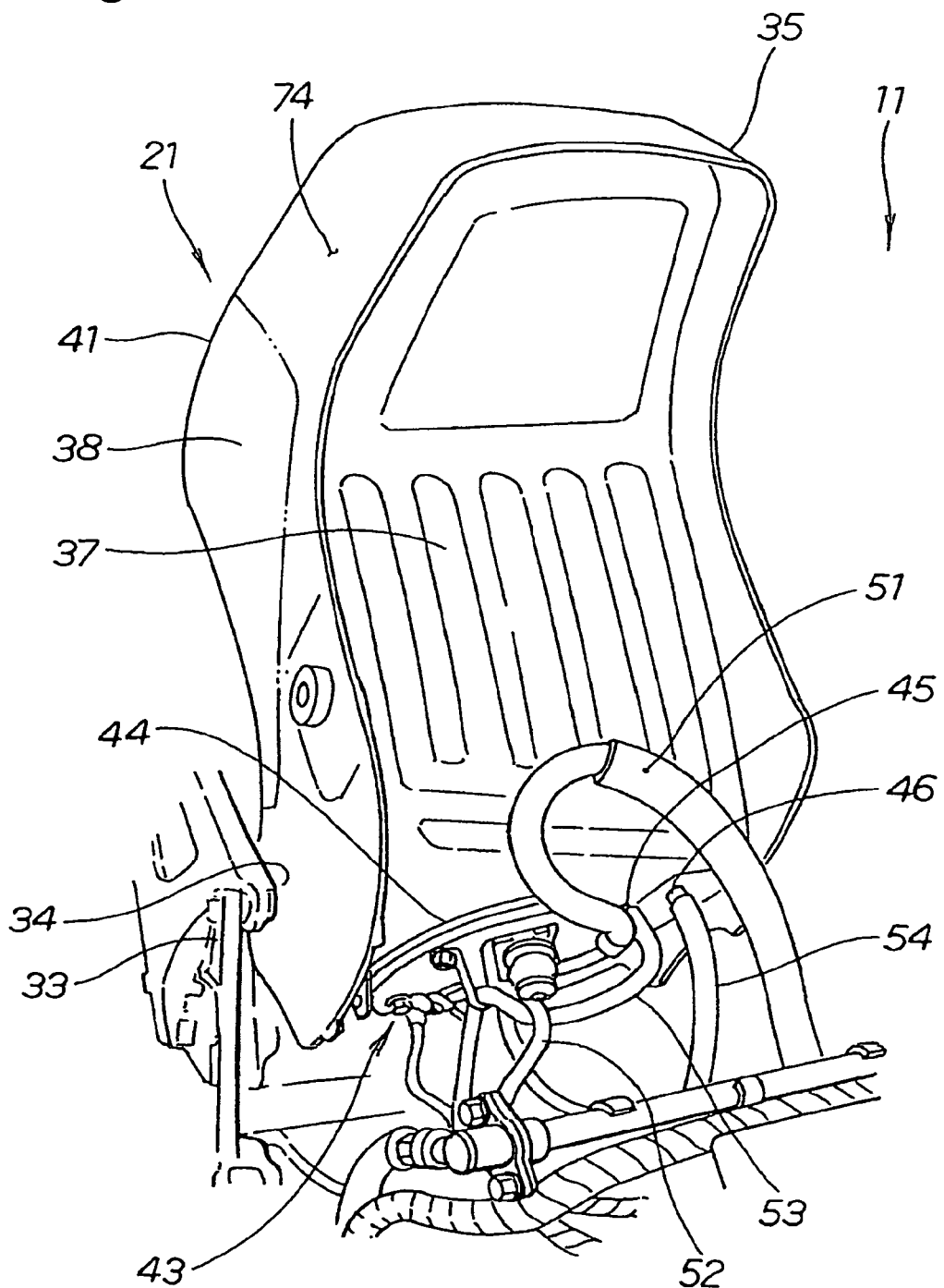
FIG. 3 is a view of the fuel tank in FIG. 2 seen in the direction indicated by the arrow 3 in FIG. 2.

FIG. 3 is a drawing of the fuel tank 21 viewed in the direction indicated by arrow 3 in FIG. 2. The fuel tank 21 includes a side portion 38 mounted to a bottom portion 37, a top portion 41 formed so as to continue from the side portion 38, and a fuel supply port 42 (see FIG. 2) formed on the top portion 41.

The bottom portion 37 includes a flange 44 for a pump for mounting a fuel supply pump unit 43, a vent port 45, and an overflow port 46. In addition, the side portion 38 is formed with the tank hinge 34.

Hereinafter in this description, a "bottom plate 74 of the fuel tank 21" comprises the bottom portion 37 including part of the side portion 38 and part of the top portion 41. More specifically, the "bottom plate 74 of the fuel tank 21" comprises the bottom portion 37 of the fuel tank 21 including part of the side portion 38 (a portion on the side of the bottom portion 37 from the chain double-dashed line in FIG. 3) and part of the top portion 41 (a portion on the side of the bottom portion 37 from the chain double-dashed line in FIG. 3) continued therefrom. The chain double-dashed line indicates a line showing an edge of the bottom plate 74.

The body portion of the fuel tank 21 is a portion of the fuel tank 21 except for the bottom plate 74.

With reference to FIGS. 2 and 3, reference numeral 51 designates a fuel hose connected to the fuel supply pump unit 43, reference numeral 52 designates an electric cable of the fuel supply pump unit 43, reference numeral 53 designates a vent hose connected to the vent port 45, and reference numeral 54 designates an overflow hose connected to the overflow port 46.

Since the motorcycle 11 has a structure in which the fuel tank 21 is rotatable to the inspection and maintenance position 35, it differs from general fuel tanks which do not rotate. Hence, it is necessary to check the behavior of components such as the fuel hose 51 connected to the fuel tank 21 as a result of the rotation before designing for mass-production. Therefore, a piping and wiring inspection jig in the form of a transparent fuel tank was manufactured.

The piping and wiring inspection jig is similar to the fuel tank 21 but is formed of transparent material. The piping and wiring inspection jig will be hereinafter referred to as a "transparent fuel tank".

Figure 4:
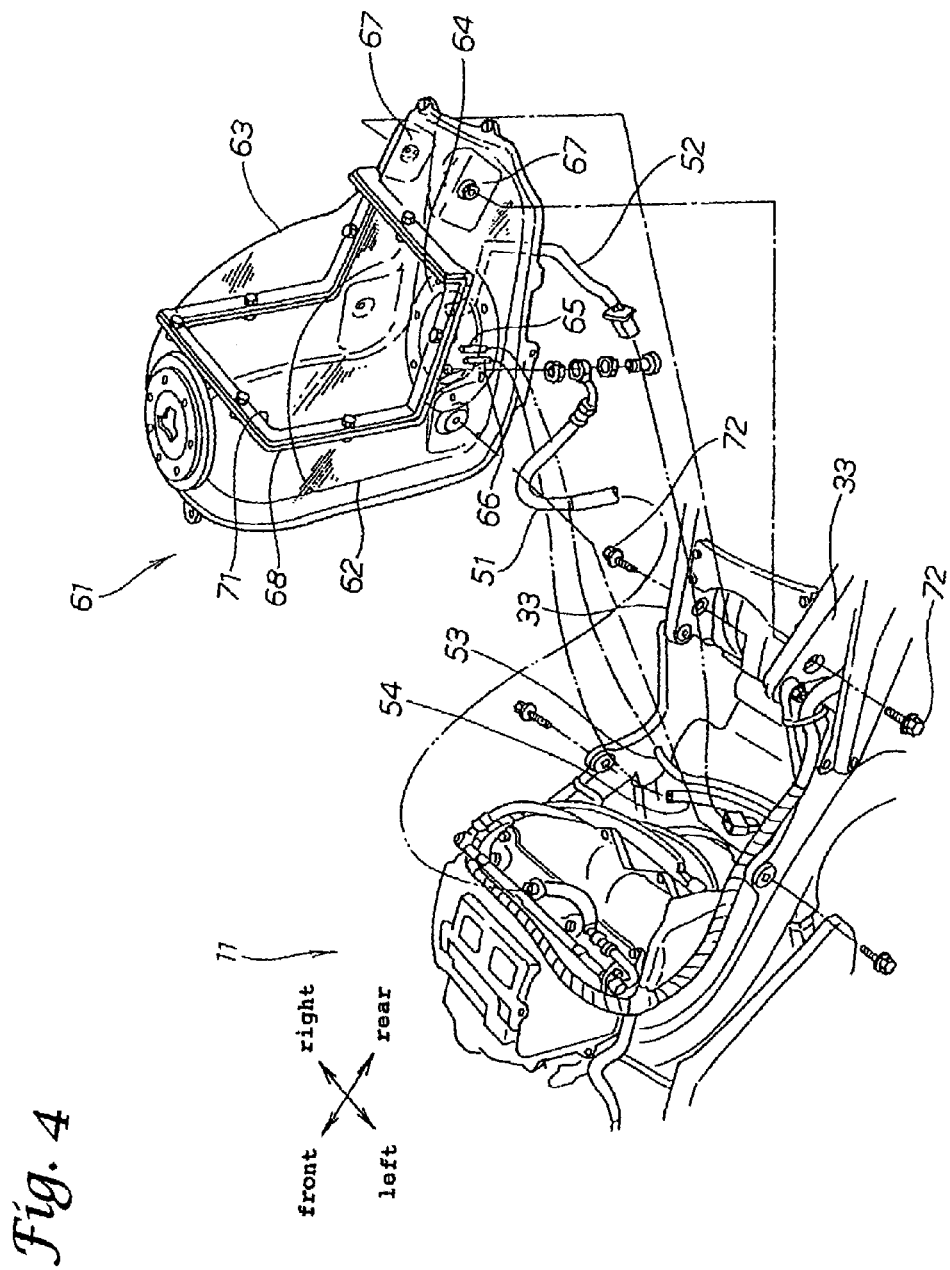
FIG. 4 is a perspective view of the transparent fuel tank according to the present invention.

FIG. 4 is a perspective view of the transparent fuel tank 61 according to the present invention. The transparent fuel tank 61 comprises a fuel tank body formed of transparent resin so that the piping and other components under the fuel tank (see FIG. 3) can be viewed. The tank 61 has generally the same shape as the normal fuel tank 21, and is a structure including a bottom plate 62 and a body portion 63 combined together.

The bottom plate 62 corresponds to the bottom plate 74 (see FIG. 3) of the fuel tank 21. The bottom plate 62 includes a projection 64 of the same shape as the fuel supply pump unit 43 (see FIG. 3) mounted to the pump mounting flange 44 (see FIG. 3). More specifically, the projection 64 has a shape corresponding to a shape outside the pump mounting flange 44 (see FIG. 3), and includes a female screw portion for connecting the fuel hose 51.

In addition, the bottom plate 62 includes a vent boss 65 having the same shape as the shape of the vent port 45 (see FIG. 3), an overflow boss 66 having the same shape as the shape of the overflow port 46 (see FIG. 3), and transparent hinges 67, 67 having the same shape as the tank hinge 34 (see FIG. 3). Further, the bottom plate 62 includes a band-shaped first flange 68 used for mating.

The body portion 63 includes a remaining portion of the side portion 38 (see FIG. 3) of the normal fuel tank 21 (see FIG. 3) and a remaining portion of the top portion 41 (see FIG. 3) continuing therefrom, and is formed with a band-shaped second flange 71 which abuts against the first flange 68.

The "piping" includes the fuel hose 51, the electric cable 52, the vent hose 53, and the overflow hose 54.

The term "the same shape" indicates that external dimensions of the transparent fuel tank 61 are the same as the normal fuel tank 21. The shape of the inner surface (back surface) where gasoline comes into contact with in the case of the normal fuel tank 21 is arbitrary.

The transparent fuel tank 61 is formed by light molding. A method of manufacturing the transparent fuel tank 61 will be described briefly. As a first step, the fuel tank 21 (see FIG. 3) is designed by a CAD device. Subsequently, the CAD information on the fuel tank 21 is copied and then, using the CAD information on the copied fuel tank 21, the transparent fuel tank 61 is designed.

Three-dimensional CAD information on the transparent fuel tank 61, which is, for example, divided into the bottom plate 62 and the body portion 63, and includes the first and second flanges 68, 71 with the respective bosses added thereto, is then prepared. Subsequently, the three-dimensional CAD information on the transparent fuel tank is input to the light molding device. By turning on a switch of the light molding device, UV-curable resin in a liquid-state that is introduced into a container of the light molding device in advance is gradually cured into the shape of the transparent fuel tank 61, whereby the transparent fuel tank 61 is molded.

It is also possible to employ blow molding which is molded from the real fuel tank instead of light molding.

While the structure including the bottom plate 62 and the body portion 63 combined together has been described above, the invention is not limited to the structure including the bottom plate 62 and the body portion 63 combined together. For example, a design in which the plate thickness is not set (i.e. a solid structure) may also be employed.

It is possible to arrange a rib as needed. For example, the plate thickness is set to 3 mm.

As indicated above, the transparent fuel tank 61 is divided into two members including the bottom plate 62 and the body portion 63. However, the number of divided members used to form the transparent fuel tank or the positions of division lines are arbitrary. For example, the dimensions of the divided members may be determined according to the specification of the light molding device. In addition, the presence or absence of the band-shaped first and second flanges 68, 71 are arbitrary.

Although the structure includes the bottom plate 62 and the body portion 63 combined by the first and second flanges 68, 71, the bottom plate 62 and the body portion 63 may be formed integrally as with the fuel tank 21 (see FIG. 3).

Referring now to FIG. 1 to FIG. 4, how to use the transparent fuel tank 61 will be described.

The transparent fuel tank 61 is mounted in substantially the same manner as the normal fuel tank 21 as shown in FIG. 1, and the actual state of the wiring and piping disposed under the transparent fuel tank 61 is inspected visually. The actual movement of the wiring and piping is also inspected visually while rotating the transparent fuel tank 61 between the normal position (see FIG. 1) and the inspection and maintenance position 35 (see FIG. 2) as indicated by the arrow a1.

More specifically, the transparent fuel tank 61 is completed by mating the band-shaped first flange 68 of the transparent bottom plate 62 and the second flange 71 of the transparent body portion 63. Subsequently, the fuel hose 51, the electric cable 52, the vent hose 53, and the overflow hose 54 are connected to the transparent fuel tank 61. The transparent hinge portions 67, 67 are then mounted to the link hinge member 33 of the vehicle body frame 12 via bolts 72, 72, so that the transparent fuel tank 61 is placed at the normal position (see FIG. 1). The upper cowl 32 (see FIG. 1) is not mounted as a matter of course. Subsequently, the extent of bending of the fuel hose. 51, the electric cable 52, the vent hose 53, and the overflow hose 54 disposed under the transparent fuel tank 61 are inspected through the transparent fuel tank 61.

All members that are normally to be connected to the fuel tank 21, such as hoses or electric cables which should be inspected, can be connected to the transparent fuel tank 61.

Since the transparent fuel tank 61 of the motorcycle 11 is formed of transparent resin so that the piping under the fuel tank 21 can be visually seen, the extent of bending or the behavior of the fuel hose 51, the electric cable 52, the vent hose 53, and the overflow hose 54, which are in the same state as if they were under the normal fuel tank 21, can be reproduced for inspection through the transparent fuel tank 61.

Further, since the transparent fuel tank 61 has the same shape as the normal fuel tank 21, and is a structure that includes the bottom plate 62 and the body portion 63 combined together, the weight of the transparent fuel tank 61 can be reduced by controlling the plate thickness of the transparent fuel tank. Hence, a light weight transparent fuel tank 61 is achieved. This makes it convenient when mounting and dismounting, or moving, the transparent fuel tank 61.

Further, since the transparent fuel tank 61 is connected to the actual fuel piping, the actual movements of the fuel hose 51, the electric cable 52, the vent hose 53, and the overflow hose 54 can be visually inspected while rotating the transparent fuel tank 61 between the normal position (see FIG. 1) and the inspection and maintenance position 35 (see FIG. 2).

Figure 5:
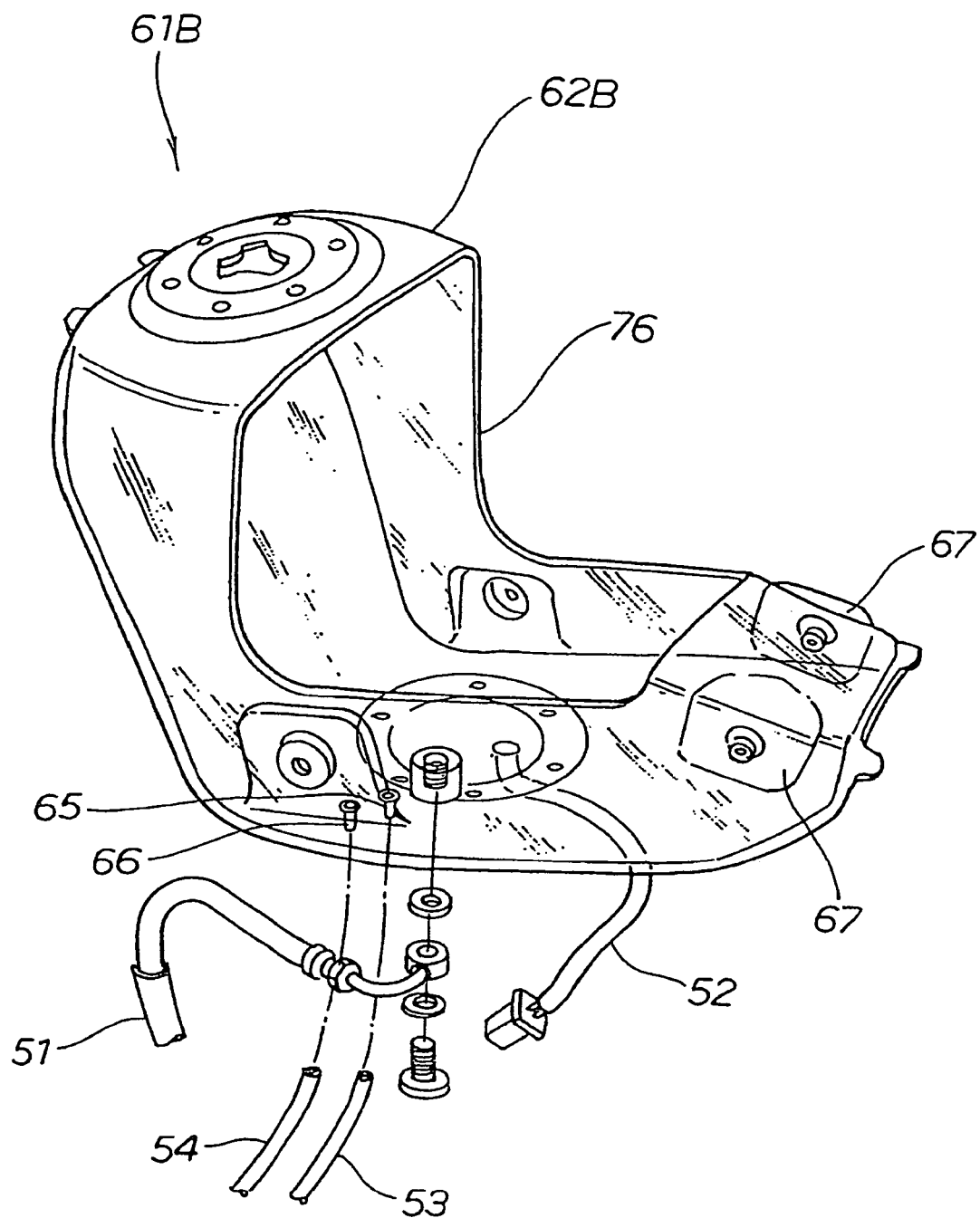
FIG. 5 is a drawing of another embodiment of the transparent fuel tank according to the present invention.

FIG. 5 is a perspective view of a transparent fuel tank 61B according to an alternative embodiment. The same structures as in the embodiment shown in FIG. 1 to FIG. 4 are represented by the same reference numerals and description of corresponding structures is omitted.

The transparent fuel tank 61B comprises a transparent bottom plate 62B which has the same shape as the bottom plate 74 (see FIG. 3) of the normal fuel tank 21. The fuel tank 61B also includes an opening 76.

The transparent fuel tank 61B with the transparent bottom plate 62B has the same effect as the transparent fuel tank 61 (see FIG. 4). Since the transparent bottom plate 62B of the transparent fuel tank 61B has the same shape as the bottom plate 74 of the normal fuel tank 21, the fuel hose 51, the electric cable 52, the vent hose 53, and the overflow hose 54 are seen only through the transparent bottom plate 62B. Hence, in comparison with a case in which these members are seen through the bottom plate 62 and the body portion 63 of the fuel tank 61 in FIG. 4, the fuel hose 51, the electric cable 52, the vent hose 53, and the overflow hose 54 are viewed through bottom plate 62B with less distortion.

Referring now to FIG. 4 and FIG. 5, another embodiment of the transparent fuel tank will be described. The transparent fuel tank can include an opening, similar to the opening 76 shown in FIG. 5, but reduced in size, and formed on a part of the body portion 63, so that the fuel hose 51, the electric cable 52, the vent hose 53, and the overflow hose 54 under the bottom plate 62 can be inspected from the inside of the tank.

In this embodiment, since the fuel hose 51, the electric cable 52, the vent hose 53, and the overflow hose 54 can be seen only through the transparent bottom plate 62 from the opening, the fuel hose 51, the electric cable 52, the vent hose 53, and the overflow hose 54 can be viewed with less distortion than the case of being viewed through the bottom plate 62 and the body portion 63.

While the transparent fuel tank has been described as being applied to a motorcycle, the same concept can be applied to three-wheelers, and to a general vehicle.

The concepts of the transparent fuel tanks 61, 61B are applicable to components other than to a fuel tank, wherever wiring or piping cannot be viewed, such as a head lamp cover, a side cover, a frame, a seat bottom plate, and a fender.

The invention claimed is:

1. A fuel tank for a motorcycle, comprising:
   a bottom plate including a bottom portion, a part of a side portion, and a part of a top portion, said bottom plate also including a first flange; and
   a body portion including a remaining portion of the side portion and a remaining portion of the top portion, said body portion also including a second flange mating with said first flange of said bottom plate to create a fuel tank body with an enclosed interior for fuel;
   wherein said fuel tank body is formed of a transparent resin so that piping and/or wiring under the fuel tank body can be viewed.

2. The fuel tank for a motorcycle according to claim 1, wherein said body portion can be removed so that part of the fuel tank body is open so that the wiring and piping under the bottom plate can be inspected from inside of the fuel tank body.

3. The fuel tank for a motorcycle according to claim 1, wherein said bottom plate further includes transparent hinges providing for said fuel tank to be rotated to a position allowing for inspection and maintenance of other motorcycle components.

* * * * *